United States Patent [19]

Tunnah

[11] 3,786,325

[45] Jan. 15, 1974

[54] ELECTRONIC MOTORLESS STIRRER

[75] Inventor: Kenneth Vincent Tunnah, Buffalo, N.Y.

[73] Assignee: Associated Biomedic Systems, Inc., Buffalo, N.Y.

[22] Filed: Sept. 14, 1970

[21] Appl. No.: 71,667

[52] U.S. Cl. .............................. 318/138, 335/268
[51] Int. Cl. ........................................... H02k 23/36
[58] Field of Search................... 318/138; 310/103, 310/104; 335/268, 272

[56] References Cited
UNITED STATES PATENTS

| | | | |
|---|---|---|---|
| R17,252 | 4/1929 | Swavely et al. | 335/268 X |
| 3,184,656 | 5/1965 | Lychyk | 335/272 X |
| 3,470,509 | 9/1969 | Silverman et al. | 335/272 X |
| 3,559,012 | 1/1971 | Gillies et al. | 318/138 |
| 3,486,099 | 12/1969 | Brunner et al. | 318/138 |
| 2,466,468 | 4/1949 | Neal | 310/103 |

*Primary Examiner*—Bernard A. Gilheany
*Assistant Examiner*—W. E. Duncanson, Jr.
*Attorney*—Shlesinger, Fitzsimmons and Shlesinger

[57] ABSTRACT

A plurality of stators are secured in a metal housing or beneath a table to form a corresponding number of stirring stations on the top of the housing or table. Each stator comprises either two pairs of wire coils wound about four, rectangularly spaced cores, with approximately one half of the coils of each pair wound about diagonally opposed cores; or a pair of intersecting cores, each of which is surrounded by a pair of wire coils. The upper ends of the four cores of the first-mentioned stator form four, rectangularly spaced poles; and the intersecting cores of each second-mentioned stator project beyond opposite ends of their associated coils and are bent upwardly also to form four rectangularly spaced poles. Each stator is mounted so that its cores form four, stationary poles at each stirring station. Like coils of each stator are periodically energized by a DC power supply to develop a rotating magnetic field, thereby to rotate a magnetic stirring slug positioned in breaker or other fluid container positioned on the stirring station.

15 Claims, 9 Drawing Figures

3,786,325
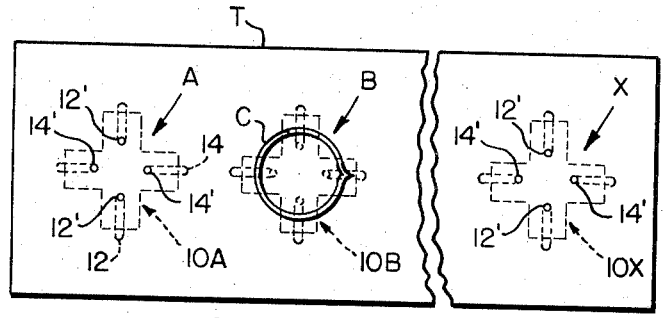
FIG. 1
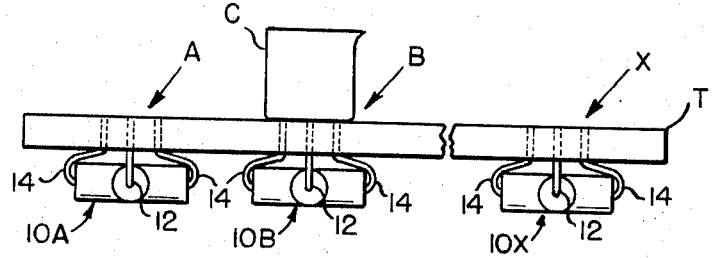
FIG. 2
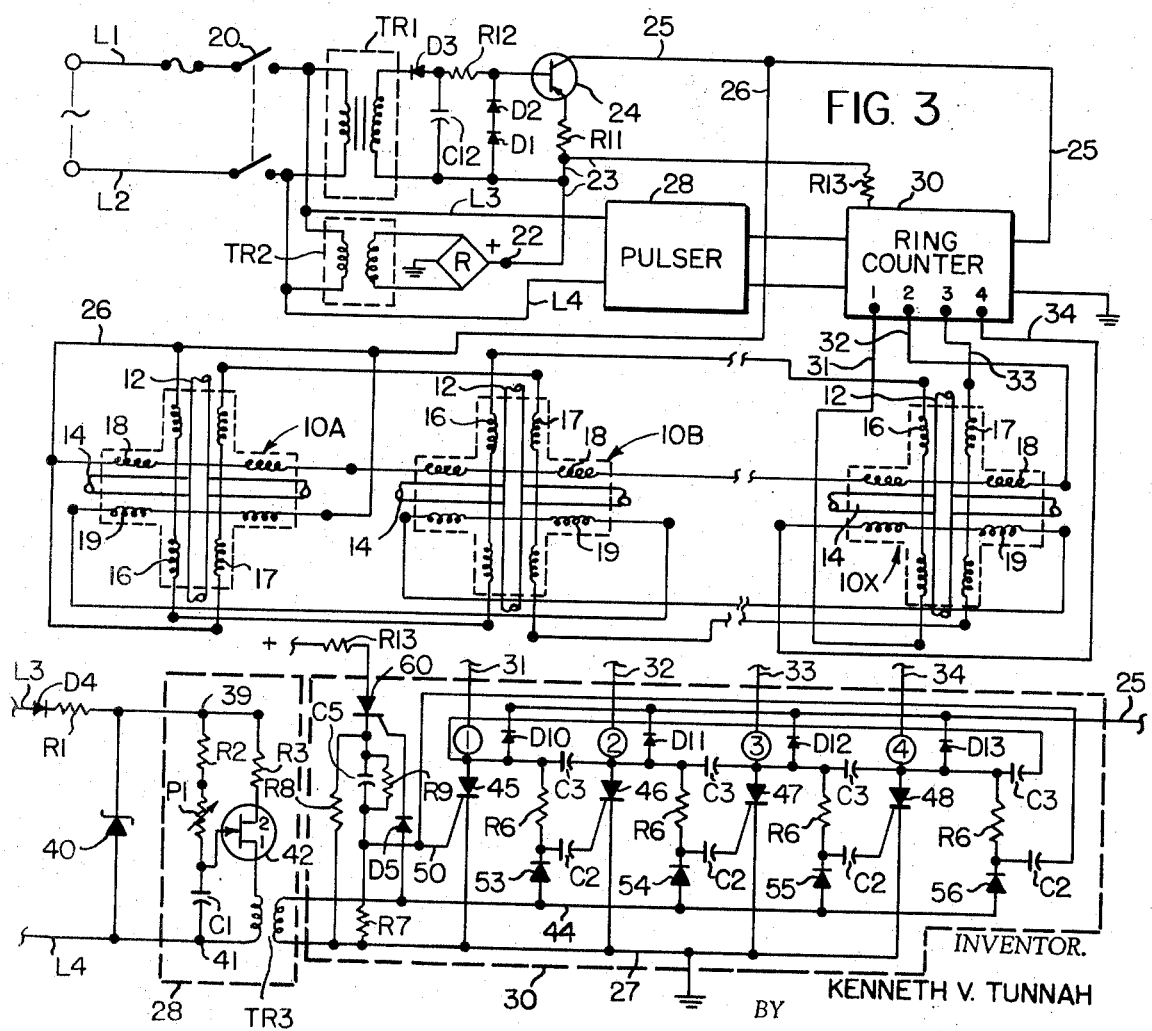
FIG. 3
FIG. 4
INVENTOR.
KENNETH V. TUNNAH

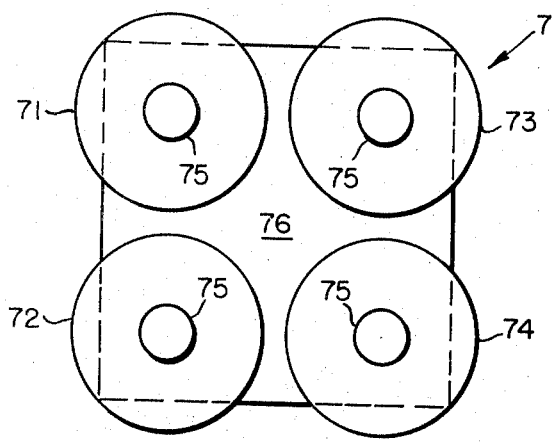
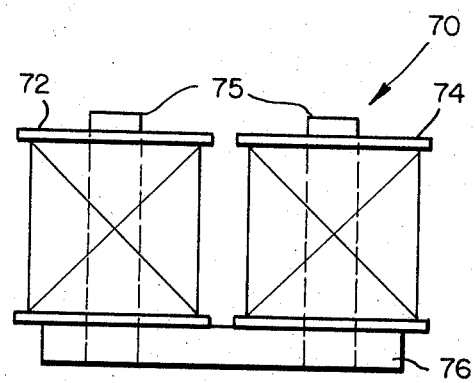
FIG. 5   FIG. 6
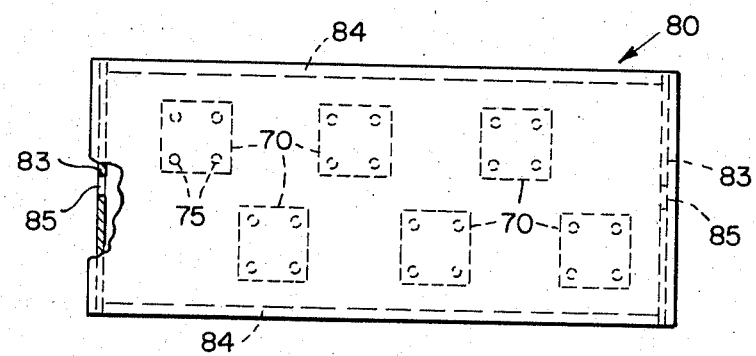
FIG. 7
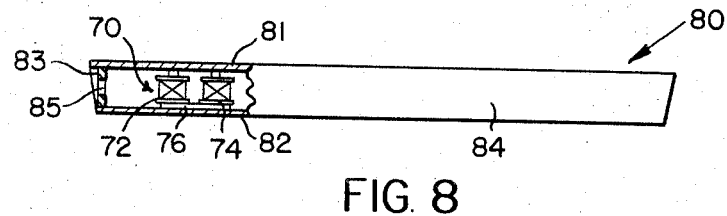
FIG. 8
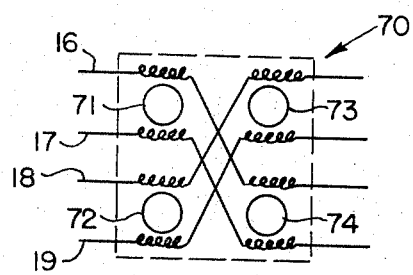
FIG. 9
INVENTOR.
KENNETH V. TUNNAH

ELECTRONIC MOTORLESS STIRRER

This invention relates to motorless stirrers, and more particularly to an electronic stirrer, which utilizes a moving magnetic field to impart rotational movement to a magnetic bar or slug disposed in the solution that is to be stirred.

Most fluid mixing or stirring devices require some form of rotating drive member which is mechanically or magnetically coupled to a driven member, which rotates in the solution that is to be stirred. Typically, in the case of a conventional magnetic stirring device, a removable magnetic or magnetizable slug is placed in a beaker containing the solution that is to be stirred; and the beaker is placed over a second magnet which is driven about a vertical axis by an electric motor, or the like.

A major disadvantage of prior such stirring devices is that they are relatively bulky, and expensive. Moreover, conventional motor-driven magnetic stirrers generate heat to objectionable degrees even in medium to low speed and in medium to light viscosity applications. Thus, the conventional magnetic stirrer has drawbacks for such delicate and precise requirements as the stirring of human or animal cell cultures in suspension systems.

One object of this invention to provide a novel, magnetic stirring device which requires no moving parts, except for a magnetizable slug disposed in the solution that is to be stirred.

Another object of this invention is to provide a magnetic type stirrer which will operate with minimal heat production.

Another object of the invention is to provide a magnetic stirrer suitable for use in high to low speed and in medium to light viscosity applications.

A more specific object of this invention is to provide a novel stirring device having stationary poles between which a rotating magnetic field is developed for imparting rotation to a magnetizable slug disposed in the solution that is to be stirred.

A further object of this invention is to provide a magnetic stirring system which can be readily expanded or contracted merely by simply plugging or unplugging stators into the system.

A further object of this invention is to provide a magnetic stirrer of the type described, which is extremely reliable, and has a life expectancy which far exceeds conventional stirrers.

Other objects of the invention will be apparent hereinafter from the specification and from the recital of the appended claims, particularly when read in conjunction with the accompanying drawings.

In the drawings:

FIG. 1 is a fragmentary plan view of a table top having mounted on the underside thereof a plurality of stators for magnetic stirrers made in accordance with a first embodiment of this invention;

FIG. 2 is a fragmentary front elevational view of this table and the stators;

FIG. 3 is a wiring diagram illustrating schematically one manner in which a plurality of the stators can be wired for simultaneous operation;

FIG. 4 is a wiring diagram illustating a particular type of pulser and ring gating device, which may be employed for energizing magnetic stators in accordance with this invention;

FIG. 5 is a plan view of a modified stator made in accordance with a second embodiment of this invention;

FIG. 6 is a front elevational view of this modified stator;

FIG. 7 is a fragmentary plan view, on a reduced scale, of a housing incorporating a plurality of these modified stators;

FIG. 8 is a fragmentary front elevational view of this device on the same scale as FIG. 7; and FIG. 9 is a schematic illustration of the manner in which the wire coils are wound on the cores of these modified stators.

Referring now to the drawings by numerals of reference, and first to the embodiment illustrated in FIGS. 1 and 2, T denotes a workbench or table top having thereon a plurality of work or stirring stations A, B, etc. to X. Mounted on the underside of the table top T beneath the stations A through X are a plurality of identical stators units 10A, 10B, . . . . 10X, respectively.

Each stator 10 comprises a pair of pole-forming rods 12 and 14, which are secured at right angles to one another adjacent their midpoints by wire coils 16, 17 and 18, 19 (FIGS. 3). Coils 16 and 17 are wound in the same direction helically, and in overlapping relation, around portions of the rod 12 at opposite sides of the point where this rod crosses rod 14; and the coils 18 and 19 are likewise wound in the same direction helically, and in overlapping relation, about portions of the rod 14 at opposite sides of the point where this rod passes under rod 12. The coils 16 and 17 are shown in FIG. 3 at opposite sides of rod 12; and the coils 18 and 19 are similarly shown in this Fig. at opposite sides of rod 14. This is merely for the purposes of clarity in illustration. In actuality the pairs of coils are wound around the respective rods 12 and 14 as stated above.

Opposite ends 12' and 14' of the rods 12 and 14, respectively, project axially beyond the associated coils 16 to 19, and are bent upward and parallel to one another. These upper ends are secured by their own resilience, or by resin, in four, spaced, rectangularly arranged vertical openings formed in the table top T at each of the stations A, B, etc. The upper or terminal ends of the rods are flush with or slightly beneath the upper surface of table top T. If desired, the coils and rods may be encased in epoxy or silicone resins or the like for the portions of their lengths indicated by dash lines in FIGS. 1 and 3.

Each stator 10A, 10B, etc. is thus supported beneath the table top by its own core members 12 and 14. At each of the stirring stations A, B, etc., the rod ends 12' and 14' form four stationary pole faces, which are equispaced rectangularly from one another, and which are adapted to produce at each station a rotating magnetic field as hereinafter described.

FIG. 3 illustrates schematically one manner in which the numerous stator units 10A, 10B. . . . 10X can be wired in series so that a rotating magnetic field can be developed simultaneously at each of the stirring stations A, B, etc. In this figure the power supply for the units is represented by a pair of input lines L1 and L2, which are connected at one end to an alternating current, single phase power supply (for example 115 volts), and at their opposite ends through a conventional ON-OFF switch 20 to the primary coils of transformers TR1 and TR2, and by lines L3 and L4 to the input of a pulser 28 (FIGS. 3 and 4).

The secondary winding of the transformer TR2 (FIG. 3) powers a direct current rectifier R, which develops approximately 35 volts DC at its positive output terminal 22. This voltage is applied by a line 23 through a resistor R13 to a ring counter 30 (FIGS. 3 and 4), through a resistor R11 to the emitter of a PNP transistor 24, and through diodes D1 and D2 to the base of transistor 24. A diode D3 and a condenser C12 are connected in series across the secondary of transformer TR1 to form a half wave power supply, which develops a bias voltage that is applied through a resistor R12 also to the base of transistor 24. The condenser C12 is connected at one side to the juncture of resistor R12 and the anode of diode D3. The collector of the transistor 24 is connected by a line 25 to the ring counter 30, and by a line 26 to the stator coils 16 - 19 as hereinafter described.

As shown in FIG. 3, like coils in successive units 10 on the table T are connected in series with one another, so that, for example, any current flowing in the coil 16 of the first unit 10A, must also flow in the coil 16 of each successive unit 10B, etc., up to and including the last unit 10X in the series. Similarly, any current which flows in one of the coils 17, 18 and 19 of the first unit 10A, must likewise flow in the corresponding coils of the remaining units or stators 10, up to and including the last stator unit 10X.

Conventional means (not illustrated), such as manually operable switches or male-female jack connections, may be provided for selectively adding additional stirrer units (stators) to, or removing stirrer units from, the series connected system, thereby to increase or decrease the available stirring stations.

Also as shown in FIG. 3, the terminal ends of the coils 16 to 19 in the last unit 10X, that is, the ends remote from the ends that are connected to the preceding stator unit 10, are connected to four different terminals 1, 2, 3 and 4 of the ring counter or gating unit 30. Specifically, the terminal ends of the coils 16, 18, 17 and 19 of the last unit 10X are connected by the wires 31, 32, 33 and 34, respectively, to the terminals 1, 2, 3 and 4 of unit 30.

As described hereinafter, the pulser 28 develops intermittent signals, which appear successively at terminals 1 through 4 of the gating unit 30 in a cyclical manner, thereby to cause cyclical and successive conduction in the series connected coils 16, 18, 17 and 19, respectively, of the numerous stators 10. The result is that a revolving magnetic field is produced at each of the stirring stations A, B, etc. as current is made to flow first in one coil and then in another of the four coils disposed about each of the two cores or rods 12 and 14 of a unit.

FIG. 4 illustrates in detail one type of pulser 28 and ring counter 30, which may be employed to produce the rotating magnetic fields described above. The ring counter 30 has a common ground line 27, which is connected to the negative terminal of the rectifier R. When switch 20 is closed, voltage from lines L1 and L2 is applied through lines L3 and L4, and through a diode D4 and dropping resistor R1 in line L3, and across a zener diode 40 to the input terminals 39 and 41 of the pulser 28. Connected in series between these terminals 39 and 41 is a fixed resistance R2, a variable resistance or potentiometer P1, and a condenser C1. The junction of the potentiometer P1 and the condenser C1 is connected to the emitter of a uni-junction transistor 42, which has its base 2 connected through a fixed resistor R3 to the terminal 39, and its base 1 connected through the primary coil of a pulse transformer TR3 to the terminal 41.

When the switch 20 is closed, a charge begins to build up in the condenser C1 at the rate which is dependent upon the amount of resistance that has been introduced into the circuit by the potentiometer P1. When the charge of this condenser has reached sufficient voltage for the transistor 42 to fire or conduct, the charge on the condenser C1 is discharged through the primary coil of TR3. As soon as this happens, the potential on the emitter of the transistor drops so that the transistor stops conducting until the charge on the condenser C1 once again reaches firing voltage. The period of time that it takes for this to occur will, of course, depend upon the setting of the potentiometer P1. Moreover, each time the transistor 42 conducts, an electrical pulse or signal is developed in the secondary coil of transformer TR3, and hence in a pulse line 44, which extends from one end of this secondary coil into the ring counter 30. The opposite end of this secondary coil is connected to ground line 27 in the counter 30.

The terminals 1, 2, 3 and 4 of the counter 30 are connected to the anodes of four silicon controlled rectifiers (SCR's) 45, 46, 47 and 48 respectively. The cathodes of these SCR's are connected to the ground line 27 so that the SCR's function as switches for controlling the flow of current from the coil leads 31, 32, 33 and 34 to ground.

Also mounted in the counter 30 is a self-starting circuit comprising an SCR 60, which has its anode connected through resistor R13 and line 23 to the DC power supply terminal 22, and its cathode connected through a condenser C5 and resistor R7 to ground line 27. A resistor R8 is connected in parallel with C5 and R7; and a resistor R9 is connected in parallel with C5. A diode D5 has its anode connected to the pulse line 44, and its cathode connected to the gating terminal of SCR 60.

Four blocking diodes 53, 54, 55 and 56 in the counter 30 have their anodes connected to the pulse line 44, and their cathodes connected through resistors R6 to the counter terminals 1, 2, 3 and 4, respectively. The cathodes of the diodes 53, 54, 55 and 56 are also connected through capacitors C2 to the gating terminals of the SCR's 46, 47, 48 and 45, respectively. Each of four additional capacitors C3 is connected between adjacent terminals 1,2; 2, 3; 3, 4; and 4, 1 of the counter 30.

The system power supply is designed to handle a plurality of series connected stators, and for this reason is provided with a current limiting circuit which will cause the system power to adjust automatically as the number of stators in operation increases or decreases, respectively. Resistor R12 is chosen to bias transistor 24 so that, when the system is in use, approximately one ampere of current flows from the collector of transistor 24 to line 25. With a decrease in the load across line 25 and the negative or ground terminal of the rectifier R, as would be the case upon removing one or more of the series connected stators, the current flow in resistor R11 attempts to increase. This causes an increase in the voltage drop across R11, which adds in series to the voltage drop across the baseemitter junction of transistor 24. When this sum reaches approximately 1.2 volts, diodes D1 and D2 start to conduct, thereby lowering the bias voltage at the base of transistor 24, and causing a reduction in the emitter to connector current appearing at line 25. The current continues to decrease until diodes D1 and D2 cease to conduct, which occurs at approximately one ampere of emitter to collector current.

Preferably the voltage from the rectifier R is set high enough to insure that, for example with 24 stirring stations (stators 10) in operation, limiting will occur when necessary. Thus the system can be expanded or contracted to accommodate from one to 24 stators without requiring any manual adjustment of the system power supply.

Normally when the switch 20 is initially closed and the pulser 28 begins to develop the pulses or signals in line 44, the terminals 1, 2, 3 and 4 of the counter 30 are at the potential of the current limiter collector, lines 25 and 26, thereby applying reverse bias to the diodes 53, 54, 55 and 56, so that the signals developed in the line 44 do not trigger the SCR's 45, 46, 47 and 48. Consequently the SCR's are in their non-conducting or blocking states, so that no current is flowing in the coils 16, 17, 18 and 19.

The first pulse developed on line 44 by the secondary of TR3 following the closing of switch 20 biases D5 in a forward direction so that an enabling signal is applied to the gating terminal of SCR60. Element 60 now conducts, or switches on, thereby causing C5 to charge rapidly through R7 to ground. This charging current causes a voltage spike across R7, which is coupled by line 50 to the gating terminal of SCR 45. Once SCR 60 is triggered, the resistor R8 operates to latch 60 in a conducting state by allowing a minimum holding current to flow from 60 to ground; and resistor R9 operates to discharge condenser C5, when power is removed from the system.

Conduction of the SCR 45 in response to the first voltage spike across R7 causes current to flow through the series connected coils 16 and line 31 and SCR 45 to ground. It also places terminal 1 of SCR 45 at approximately ground potential. The next successive SCR 46 is not conducting at this time, so that its associated terminal 2 is at the potential of the rectifier terminal 22, so that current flows therefrom through the associated capacitor C3 and the first SCR 45 in order to charge the last mentioned capacitor.

As soon as the next pulse or signal appears on the line 44 the diode 53 is biased in a forward direction, because at this time terminal 1 is at nearly ground potential, while diodes 54, 55 and 56 remain non-conductive, because terminals 2, 3 and 4 are at the potential of the current limiter collector lines 25 and 26. Consequently diode 53 conducts through the associated resistor R6 and the now-conducting SCR 45 to ground, thus producing a pulse across the last-named resistor R6. This pulse charges the capacitor C2, which is connected to the gate terminal of the SCR 46, so that this latter SCR now commences to conduct, allowing current to flow through the series connected coils 18. The previously charged capacitor C3 now discharges through the SCR 45 causing a reverse current flow, which shuts off SCR 45. Current therefore ceases to flow in the coils or windings 16, but is now flowing in the windings 18.

The above sequence is repeated the next time a pulse appears on line 44, but this time in connection with the diode 54, which will be the only diode of the four diodes 53 to 56 biased in the forward direction at this time, whereby the SCR 47 is made to conduct, and the SCR 46 is returned to its blocking state. Similarly with the next pulse on line 44 the SCR 48 is switched to its firing or conducting state, thereby blocking SCR 47; and with the next signal on line 44 the diode 56 conducts once again to gate the SCR 45, and to block the SCR 48. Thus the coils 16, 18, 17 and 19 of each unit 10A, 10B, etc. are successively energized in a cycle commencing with the triggering or gating of SCR 60, and automatically repeating until such time that the main switch 20 is opened.

Because of the disposition of the coils 16, 17, 18 and 19 in each stirrer unit, a rotating magnetic field is developed above the surface of the table top T at each of the statons A, B, etc. At each station this rotating magnetic field acts upon a magnetizable slug (not illustrated) suspended in the beaker or container C mounted thereabove, so that the slug is made to rotate within the container, thus sitrring its contents.

In the counter 30 (FIG. 4) four diodes D10, D11, D12 and D13 have their anodes operatively connected to the counter terminals 1, 2, 3 and 4, respectively; and their cathodes connected through line 25 to the collector of the transistor 24. These diodes function to reduce the counter emf developed by the coils 16 to 19 when switching occurs.

Referring now to the embodiment of the invention illustrated in FIG. 5 to 9, wherein like numerals are employed to designate elements similar to those employed in the embodiment of FIGS. 1 to 4, 70 denotes a modified stator comprising four, identical, dielectric spools or bobbins 71, 72, 73 and 74, each of which has a soft iron core or rod 75 secured in its central bore coaxially thereof. Each core 75 projects slightly beyond opposite ends of its associated bobbin, and is secured at one end in one of four, rectangularly spaced, parallel openings formed in a rectangular, metal plate 76, so that the lower ends of the bobbins (FIGS. 6 and 8) rest against the upper face of plate 76 in spaced relation to one another.

As in the first-described embodiment, each stator 70 is provided with four wire coils 16, 17, 18 and 19. In this embodiment, however, as shown diagramatically in FIG. 9, two of the coils 16 and 17 are wound in part (approximately one half) helically and in the same direction around one bobbin 71, and in part (approximately one half) helically and in the same direction around the diagonally opposite bobbin 74. Similarly, the two remaining coils 18 and 19 are wound in part, helically and in the same direction, about the bobbin 72, and in part, helically and in the same direction, about the diagonally opposite bobbin 73. The wires or coils 16 and 17 are wound from the top down, on bobbin 71, and from the bottom up, on the associated bobbin 74 (or vice versa) so that when current flows in either coil 16 or 17, the upper ends of the associated cores will be of opposite polarity. The coils 18 and 19 are wound in similar fashion on bobbins 72 and 73 to assure opposite polarity of the upper ends of their cores 75, when in use.

In FIGS. 7 and 8, 80 denotes a multi-station magnetic stator-holding device comprising an elongate housing containing a plurality of staggered stator units 70. Housing 80 has flat, parallel top and bottom walls 81 and 82, respectively; spaced parallel end walls 83; and parallel side walls 84. Each end wall has therein a central opening 85 through which wire leads for the stator coils may pass. The base plate 76 for each stator in housing 80 is secured in any conventional manner to the housing bottom wall 82 so that the stators are conveniently spaced from one another, and with the upper ends of the four cores 75 of each stator disposed in a common horizontal plane immediately beneath the upper wall 81. Each stator 70 in housing 80 thus defines a separate stirring station, with the upper ends of the four cores 75 of each stator corresponding to the four rectangularly spaced poles defined by the core ends 12' and 14' of the stators 10 of the first embodiment.

As in the case of the first embodiment, respective coils 16, 17, 18 and 19 of the numerous stators 70 in housing 80 are connected in series with one another through the counter 30 in the same manner as illustrated by the wiring diagrams of FIGS. 3 and 4, whereby during operation, the upper ends of the cores 75 at each station produce a magnetic field which revolves about the vertical centerline of the associated stator, thereby to rotate a magnetic slug in the beaker or other container positioned on housing 80 above that station.

The base plates 76 of the stators 70 may be made of cold rolled steel, and serve to help complete the magnetic circuit between the cores of the stator. The housing 80 may be made of stainless steel or other paramagnetic or diamagnetic material.

From the foregoing it will be apparent that the instant invention provides an extremely simple and reliable magnetic stirrer, which is substantially devoid of moving parts, and which offers an infinitely variable speed adjustment merely by proper adjustment of the potentiometer P1. By using an automatic starting circuit, the device will automatically restart following a momentary accidental power failure, and the limiting circuit in the power supply will automatically limit the current flow in the system in response to the addition or removal of stirring units. It is particularly useful in replacing conventional motor-driven magnetic stirrers in high to slow speed and medium to light viscosity applications. Another important advantage of the unit of this invention is that it produces or gives off a minimal amount of heat during use. This makes this apparatus practical for stirring human and animal cell cultures in suspension systems. Because of its compact size it can be installed in existing incubators without internal modifications. Plastic shelving with embedded stators, for example, can be manufactured for installation in walk-in incubators, laboratories, bench tops, etc., since the stator life expectancy is infinite. In addition, units of this type may be installed, for example, in kitchen ranges as stirring devices for soups, etc., in which case, of course, glass pots or diamagnetic or paramagnetic containers would need be employed.

In practice, a pulser 28 may be used that is capable of producing from 0.1 pulses to 50 pulses per second. When a four terminal stator of the type illustrated is used, and the four coils of each unit 10 or 70 are correctly phased with the ring counter 30, these pulses are capable of producing at each stirring station a magnetic field which revolves from between 1 to 750 revolutions per minute, depending upon the setting of the potentiometer P1. The magnetic bar or slug, which is suspended in the solution contained in the beaker disposed above the energized stator assembly, will track or follow the rotating magnetic field to stir the solution.

The ability of the magnetic bar to track is related, of course, to the strength of the magnetic field, the distance between it and the stator, and the viscosity of the solution being stirred.

While the invention has been described in connection with embodiments thereof in which a rotary motion is imparted to the bar magnet or slug placed in the vessel containing the liquid, which is to be stirred, it will be understood that the actuating electromagnetic cores of the device may be disposed to effect any other suitable movement of the bar magnet or slug. Thus, the cores and the energizing coils associated therewith may be so disposed and operated as to effect back and forth oscillatory or rectilinear movement of the bar magnet or slug. It is the agitation of the solution without a motor drive that marks the advance achieved by the present invention. Moreover, although the stators 70 have been described as being particularly useful in conjunction with a separate housing 80, it will be apparent, that if desired, one or more such stators may be suspended beneath a table top in a manner similar to the stators 10, merely by securing the upper ends of the cores 75 of a stator 70 in registering openings in the table top. Although the stator 70 has four separate cores 75, these cores nevertheless function in pairs, with diagonally opposite cores forming the opposite poles of an electromagnet, in a manner similar to the way the opposite ends of the cores 12 and 14 of a stator 10 form opposite poles of an electromagnet.

It will be understood, too, that while the invention has been described in connection with embodiments thereof in which a plurality of stators are provided, all of which operate simultaneously, it is contemplated that where all of the stators do not have to be used at the same time, as where there are less vessels to be stirred than there are stators on a bench top, those not in use can be shut off by conventional switch means provided in the circuits to their coil or coils.

Having thus described my invention, what I claim is:

1. Magnetic stirring apparatus, comprising
   a support having an upper plane supporting surface,
   a plurality of magnetizable cores,
   means for mounting said cores on said support with at least one end of each core fixed in a common plane to form a plurality of stationary poles angularly spaced about a common axis, which extends transverse to said surface,
   a plurality of stationary electrical coils, each of said coils being wound about at least one of said cores, and said one ends being disposed about said axis, and
   means for momentarily successively energizing said coils to develop between said poles a magnetic field which moves about said axis above said surface to impart corresponding movement to a stirring bar in a vessel mounted on top of said surface in registry with said axis.

2. Magnetic stirring apparatus as defined in claim 1, wherein
   there are four of said cores,
   each of said coils is wound in part about two of said cores, and
   said one ends of said two cores are disposed 180° from each other at diametrally opposite sides of said axis.

3. Magnetic stirring apparatus as defined in claim 2, wherein said mounting means comprises a metal plate, said four cores are secured to and project at said one ends thereof from said plate parallel to said axis, and in rectangularly spaced relation thereabout, and at least one of said coils is helically wound in part around one of said cores, and in part around the diagonally opposite core, and at least one other coil is helically wound in part about each of the other pair of diagonally opposite cores.

4. Magnetic stirring apparatus as defined in claim 3, wherein two separate coils are helically wound in part about each pair of diagonally opposite cores, and said energizing pulsing means includes means for alternately energizing one of the coils wound about one pair of diagonally opposite cores, and then one of the coils wound about the other pair.

5. Magnetic stirring apparatus as defined in claim 3, including a metal housing having spaced, parallel, upper and lower walls, respectively, and means securing said plate in said housing on said lower wall with said one ends of said cores disposed adjacent the underside of said upper wall.

6. Magnetic stirring apparatus as defined in claim 1, wherein there are two of said cores extending transverse to one another, and opposite ends of said two cores project beyond opposite ends of the coils thereon and are disposed in said common plane.

7. Magnetic stirring apparatus as defined in claim 6, wherein two coils are wound on each of said cores, and said energizing means energizes alternately a coil on one, then a coil on the other of said cores.

8. Magnetic stirring apparatus as defined in claim 6, including a horizontal support having a plane upper surface disposed parallel to said common plane, and means securing said opposite ends of said cores in four, rectangularly arranged, vertical openings in said support, thereby to support said cores and said coils beneath said support.

9. Magnetic stirring apparatus as defined in claim 1, wherein said energizing means comprises a direct current power supply, a triggerable ring counter for selectively connecting said coils to said power supply, and having a plurality of signal-responsive, solid state switching devices, each of which is connected in circuit with one of said coils normally to block the flow of current therethrough, means for developing intermittent signals, and means for applying said signals to said devices and operative, upon triggering of said counter, repeatedly to render successive ones of said devices momentarily conductive, thereby cyclically to produce momentary current flow in successive ones of said coils.

10. Magnetic stirring apparatus as defined in claim 9, including a switch for selectively actuating and deactuating said direct current power supply, and means for automatically triggering said ring counter, when said direct current power supply is actuated.

11. Magnetic stirring apparatus, comprising a stator comprising a plurality of cores angularly disposed relative to one another, and at least one electrically conductive coil wound about each of said cores, means fixing at least one end of each of said cores in a horizontal plane beneath a liquid-containing vessel adapted to have a magnetizable bar therein, said one ends defining at least two pairs of stationary poles angularly spaced about a vertical axis through said vessel, and means for supplying electrical power cyclically and successively to said coils to magnetize said cores momentarily and successively thereby to develop successively between each of said pairs of poles at said plane a magnetic field which moves about said axis, and which imparts a corresponding movement to said bar.

12. Magnetic stirring apparatus as defined in claim 11, including a second stator comprising a second plurality of cores angularly disposed relative to one another, each of said second plurality of cores having wound thereabout at least one further electrically conductive coil, means fixing at least one end of each of said second plurality of cores in said horizontal plane beneath a second vessel to define at least two additional pairs of poles disposed in angularly-spaced relation about a second vertical axis spaced from the first-named vertical axis, and means connecting one coil on each of the first-named plurality of cores in series with one of said further coils on each of said second plurality of cores, said electrical power means being operative cyclically and successively to apply power to each pair of series connected coils, thereby to develop moving magnetic fields simultaneously about each of said axes.

13. Magnetizable stirring apparatus as claimed in claim 11, wherein said stator comprises four identical dielectric bobbins, each of which has a soft iron core secured coaxially of the bobbin, and the coil is wound from the top down on one bobbin and from the bottom up on the diagonally opposite bobbin so that the upper ends of diagonally opposite cores will be of opposite polarity.

14. A control device for successively energizing a plurality of coils, comprising a direct current power supply, a plurality of electrically conductive coils connected in parallel, switching means for selectively and successively connecting one side of each of said coils to ground, current limiting means interposed between the opposite side of each of said coils and the positive terminal of said power supply, said limiting means comprising a transistor having its emitter connected through a first resistor to said positive terminal, and its collector connected to said opposite side of each of said coils, and means applying a bias voltage to the base of said transistor and responsive to a change in the voltage drop across said first resistor to cause a change in the bias voltage applied to said base, thereby to limit the emitter to collector current flow in said transistor.

15. A control device as defined in claim 14, wherein said switching means comprises a trigger circuit responsive to a trigger signal to effect cyclical and successive connection of said one sides of said coils to ground, a switch is operable manually for selectively actuating and deactivating said power supply, and a solid state switching device is interposed between said positive terminal and said trigger circuit and is operative, when said power supply is actuated, automatically to develop and apply a trigger signal to said trigger circuit.

* * * * *